(12) United States Patent
Carvey et al.

(10) Patent No.: US 6,934,471 B1
(45) Date of Patent: Aug. 23, 2005

(54) PHOTONIC SWITCH USING TIME-SLOT INTERCHANGE

(75) Inventors: Philip P. Carvey, Bedford, MA (US); William J. Dally, Stanford, CA (US)

(73) Assignee: Avici Systems, Inc., North Billerica, MA (US)

( * ) Notice: Subject to any disclaimer, the term of this patent is extended or adjusted under 35 U.S.C. 154(b) by 0 days.

(21) Appl. No.: 09/325,119

(22) Filed: Jun. 3, 1999

(51) Int. Cl.[7] .............................................. H04J 14/00
(52) U.S. Cl. ............................ 398/45; 398/47; 398/51; 398/54
(58) Field of Search ............................ 398/45, 46, 47, 398/51, 52, 54, 75, 98, 102; 370/235.1, 237, 389, 229, 230.1, 752, 369–379, 412–418, 465–468; 359/117, 111, 123, 128, 135, 139, 140

(56) References Cited

U.S. PATENT DOCUMENTS

| 4,485,467 A | * | 11/1984 | Miles et al. ................... 370/14 |
| 5,093,920 A | * | 3/1992 | Agrawal et al. ............ 395/800 |
| 5,168,492 A | | 12/1992 | Beshai et al. .............. 370/60.1 |
| 5,303,077 A | * | 4/1994 | Bottle et al. ................ 359/117 |
| 5,390,178 A | * | 2/1995 | Hunter ....................... 370/370 |
| 5,455,701 A | * | 10/1995 | Eng et al. .................... 359/121 |
| 5,457,556 A | * | 10/1995 | Shiragaki ..................... 359/117 |
| 5,469,284 A | * | 11/1995 | Haas .......................... 359/139 |
| 5,475,679 A | * | 12/1995 | Munter ....................... 370/58.2 |
| 5,745,486 A | | 4/1998 | Beshai et al. ............... 370/352 |
| 5,748,614 A | * | 5/1998 | Wallmeier ................... 370/235 |
| 5,784,372 A | * | 7/1998 | Faulds ........................ 370/398 |
| 5,912,753 A | * | 6/1999 | Cotter et al. ................ 359/108 |
| 5,978,370 A | * | 11/1999 | Shively ....................... 370/370 |
| 6,111,673 A | * | 8/2000 | Chang et al. ............... 359/123 |
| 6,185,221 B1 | * | 2/2001 | Aybay ........................ 370/412 |
| 6,417,944 B1 | * | 7/2002 | Lahat et al. ................. 398/79 |

FOREIGN PATENT DOCUMENTS

| EP | 0 641 108 A2 | 3/1995 |
| WO | WO99/11033 | 3/1999 |

\* cited by examiner

*Primary Examiner*—M. R. Sedighian
*Assistant Examiner*—Dalzid Singh
(74) *Attorney, Agent, or Firm*—Hamilton, Brook, Smith & Reynolds, P.C.

(57) ABSTRACT

An optical data stream is converted to electrical signals which are applied to a time-slot interchanger. The time-slot interchanger recorders the packets or cells of the data stream to correspond to the schedule of an optical switch. The time-slot interchanger may contain a plurality of FIFOs implemented as circular buffers in a single dual port memory. The switch schedule may be determined by the average load between inputs and outputs and may be determined by the number of packets or cells queued from each input or each output in the time-slot interchangers.

20 Claims, 3 Drawing Sheets

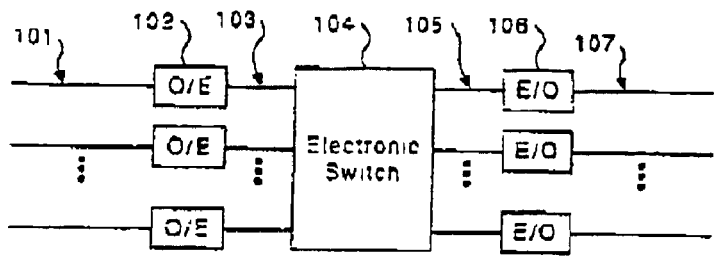
Figure 1: Prior Art
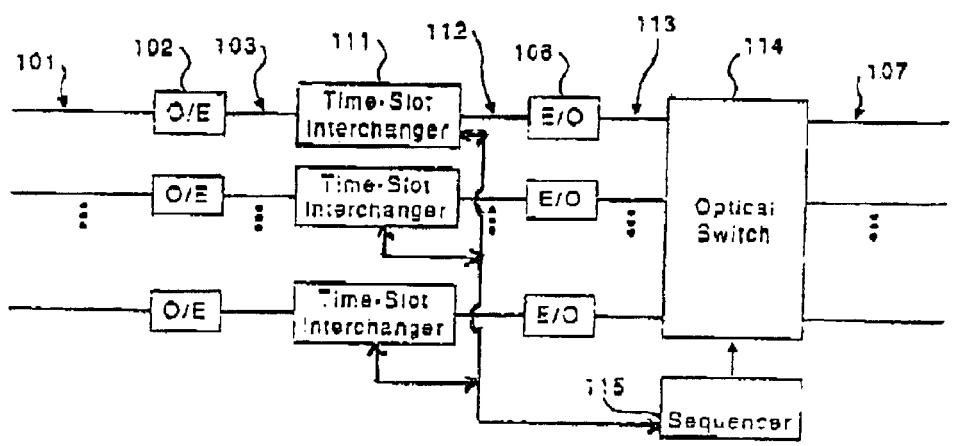
Figure 2
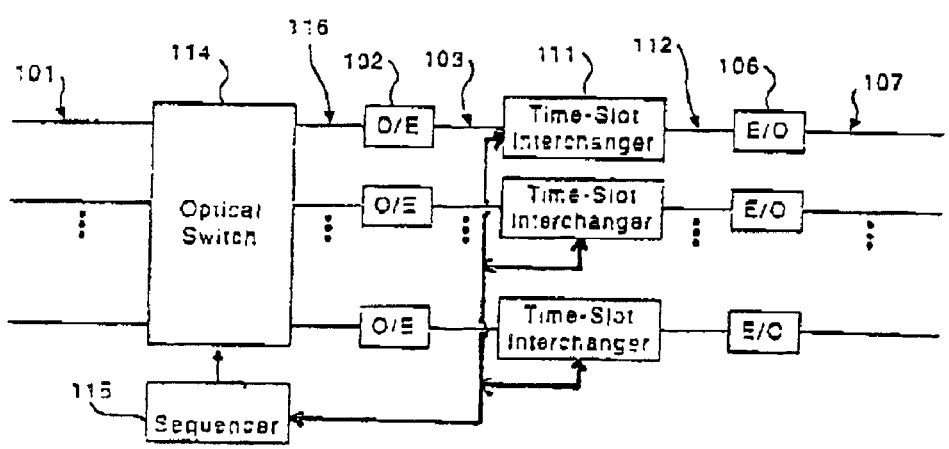
Figure 3

PHOTONIC SWITCH USING TIME-SLOT INTERCHANGE

BACKGROUND OF THE INVENTION

High-speed telecommunications switches accept optical inputs and produce optical outputs but internally involve almost entirely electronic switching. Single-mode optical fibers are the technology of choice for long-haul transmission of information because they have very wide bandwidth, low attenuation, and low dispersion, making it possible to transmit information at very high bit rates ($10^{10}$ b/s) over long distance ($10^5$ m) without the need of repeaters. Digital electronics, however, is the technology of choice for switching. Digital integrated circuits can switch connections in less than a nanosecond, and $10^5$ to $10^6$ digital gates can be incorporated on a single integrated circuit facilitating construction of the logic that controls a fast switch on a cycle by cycle basis.

FIG. 1 shows a block diagram of prior art telecommunications switch. Inputs arrive on single-mode optical fibers 101. In a typical application, these fibers carry a serial bit stream at 2.5 Gbits/s (OC48) and are formatted using SONET (synchronous optical network) framing. The signal on each input fiber 101 is converted to electrical form by optical-to-electrical (O/E) converters 102. These converters demultiplex the data stream, converting the 2.5 Gbits/sec serial stream into a 16-bit wide stream at 156 Mbits/s. This electrical version of the input stream 103 is then input to an electronic switch 1–4. The switching fabric of the internet routers described in published PCT patent application number PCT/US98/16762 is an example of such a switch. The switch extracts individual packets or cells (depending on the protocol) from the SONET frames (or other framing) of the incoming streams on each input and forwards each packet or cell to the output to which it is addressed. At the output, the packets or cells are encapsulated in a SONET frame and output electronically. This electrical output stream 105 is then output to an electrical-to-optical converter (E/O) and the optical output stream 107 drives the long-haul fiber to the next telecommunications switch.

It is attractive to use an electronic switch to direct optical signals because it is very easy to build logic and memory electronically, and very difficult to realize these functions optically. The switch requires logic to examine the contents of packets and determined where they are to be routed, and the switch requires memory to buffer packets according to a quality-of-service.

SUMMARY OF THE INVENTION

As the demand for bandwidth grows exponentially, both the number of ports on telecommunications switches, and the bandwidth per port also increases exponentially. These trends make it increasingly difficult to build electronic switches. Each electronic signal in a typical switch has limited bandwidth (usually less than 1 Gbits/s and often only 100–200 Mbits/s), thus wide paths are needed to carry the electronics form of an optical data stream. These wide paths add considerable expense to an electronic switch. As switches move to OC192 (10 Gbits), 32-bit paths at 311 Mbis/s per signal are needed to carry input electronically, and at OC768 (40 Gbits/s), a 128-bit electronic bus at 311 Mbits/s will be needed to carry the information on a signal optical fiber. Also, electronic signals can travel only a limited distance due to attenuation. This further complicates the design of electronic switches, particularly as the number of ports increases.

While an all-optical switch addresses the problem of electronic bandwidth, it has difficulty performing the logic needed to route packets or providing the memory required for packet buffering. Also, optical switches typically switch very slowly (tens of microseconds to hundreds of milliseconds), making it impossible to switch individual packets or cells that may be less than 10 nanoseconds long (e.g., a 40-byte packet at OC768 lasts only 8 ns).

In accordance with the present invention, a telecommunications switch comprises a plurality of optical inputs and a plurality of optical outputs. An optical switch operates with a schedule that is not directly determined by the input stream. The ordering units rearrange the order of data units, such as packets or cells, within data streams to correspond to the schedule of the switch. The reordering may be made in either input streams or output streams.

Preferred switches include a crossbar or a multi-stage interconnection network. The preferred reordering unit is a time-slot interchanger which contains a plurality of FIFOs. The FIFOs are implemented as circular buffers in a single dual port memory. The switch schedule may be fixed and balanced, or it may be unbalanced. In the latter case, the switch schedule may be determined by the average load between inputs and outputs. More specifically, the switch schedule may be determined by the number of data units queued from each input for each output in time-slot interchangers.

The present invention combines the best feature of electronics and optics to overcome the bandwidth bottleneck of electronics switching, while at the same time using electronics to provide logic and memory. Also, this arrangement handles the switching of short (nanosecond) packets using optical switches that can be reconfigured at microsecond to millisecond time scales.

The present invention does require conversion of the input signal from electrical to optical and back again. However, this conversions is required in any case for signal regeneration.

All of the operations performed electronically on the data streams are local to a single input, and thus require a minimum of wide electrical pathways. Electronics are used to provide logic and memory, and optics are used to provide switching bandwidth. Electronic memory is used to buffer packets or cells until they are to be transmitted. All of the switching is performed optically.

The present invention is also well matched to the properties of an optical switch. By grouping many packets traveling to the same output together in time, the present invention allows short (nanosecond) length packets to be switched while reconfiguring the optical switch only once every sub-frame, or multi-frame time period (microseconds or milliseconds). Also, the optical switch can be controlled with a fixed pattern, without the need to examine the arriving data to configure the switch. Alternatively, the switch can be controlled with an adaptive pattern that uses only average input to output load statistics to balance load across the switch. In either case, the configuration of the optical switch does not directly depend upon the data it is switching.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same part throughout the different views. The drawings are not nec- FIG. 1 is an illustration of a conventional telecommunications switch;

FIG. 2 is an illustration of one embodiment of the present invention;

FIG. 3 is an illustration of an alternative embodiment of the invention;

DETAILED DESCRIPTION OF THE INVENTION

The present invention operates by converting the incoming streams to electronic form, but performs no switching on these electronic streams. As illustrated in FIG. 2, each electronic input stream 103 is input to a time-slot interchanger (TSI) 111. The TSI examines the packets within an input stream, using logic to make routing decisions, and reorders them in time (exchanging their time slots) so that packets traveling to a given output are grouped together in time. The reordered streams 112 are then converted back to optical form. These reordered optical stream 113 are then input to an all-optical switch that changes its connectivity in a fixed pattern at a relatively slow rate. Each TSI schedules the packets entering the optical switch to arrive at a time when its input is connected to the packet's destination.

Figure 6:
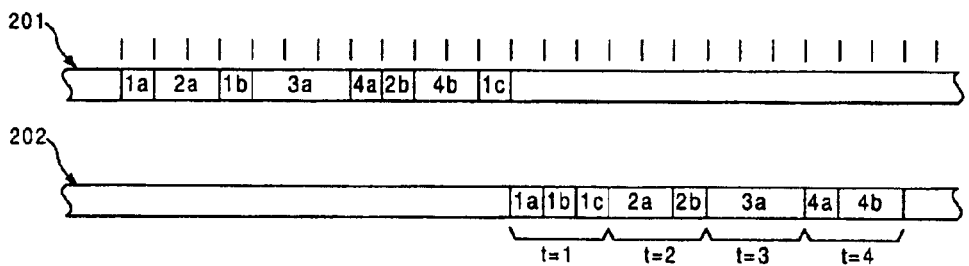
FIG. 6 illustrates an exemplary input sequence of data packets in the reordering of the sequence.

FIG. 6 shows an input stream of packets 201 on an input line 101 and a reordered stream of packets 202 on internal line 113. Each packet is marked with a number denoting the output port to which it must be forwarded and a letter denoting its sequence. For example, packet 2b is the second packet that must be forwarded to output port 2.

The TSI 111 reorders the packets in input stream 201 so that all packets destined for the same output are consecutive and occupy a fixed time period on the reordered stream 202 on internal line 113. During time period t=1, packets destined to output port 1 are transmitted on line 113, during period t=2, packets destined to port 2 are on line 113, and so on. This ordering of packets matches the connections provided by the optical switch 114 under control of sequencer 115. During time period t=1, the switch connects input 1 to output 1, during time period t=2, the switch connects input 1 to output 2, and so on. Thus, by reordering the packets in time, the TSI 111 is able to route the packets by lining them up with periods during which the switch will be connected to the desired output. For example, the packet labeled 2b is placed on the input 1 of the switch 114 during period t=2 and thus is forwarded to output 2 of the switch as desired.

Figure 4:
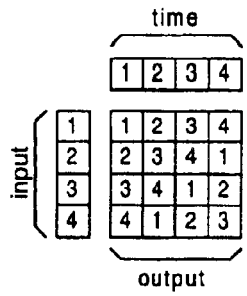
FIG. 4 shows an example of the schedule of input/output connections in a switch.
Figure 5:
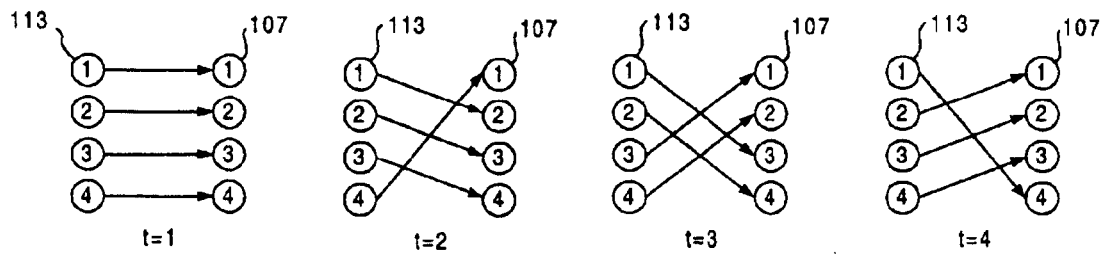
FIG. 5 illustrates the connections of FIG. 4 in graphical form.

The details of the switch and sequencer 115 operation are illustrated in FIGS. 4 and 5. FIG. 4 shows, in tabular form, how the sequencer directs the switch to connect inputs to outputs during each of the four periods. FIG. 5 shows this same information graphically. During period t=1, for instance, the figures show that the inputs are connected straight across to the outputs. During period t=2, the connections are rotated by 1 with input 1 connected to output 2, input 2 to output 3, and so on. In general during period t=x, input i is connected to output i+x−1 (mod 4). The sequencer repeats these four connections indefinitely, connecting each input to each output in turn. The interchangers, knowing this pattern in advance, schedule packets to appear on a switch input during the time period when that input is connected to the desired output. In a preferred embodiment of the present invention, each time period or time-slot is 10 microseconds in length.

Figure 8:
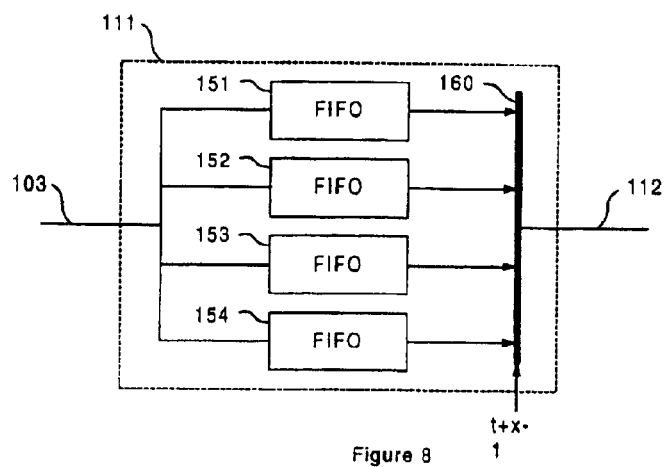
FIG. 8 illustrates a FIFO implementation of a time-slot interchanger.

The TSI 111 that reorders packets to make packets destined for the same output contiguous can be conceptually implemented using a FIFO for each output as illustrated in FIG. 8 for the case of four outputs. The interchanger consists of four FIFOs 151–154, and a multiplexer, 160. As each packet arrives on electronic input stream 103, it is examined to determine the output port to which it should be forwarded. It is then appended to the end of a FIFO queue of packets associated with this output. During each time-slot of the optical switch, multiplexer 160 is switched to select the FIFO associated with the selected output of the switch. Packets are then read from this selected FIFO to reordered electronic input stream 112 until the time-slot is over or the FIFO is emptied. If the FIFO is emptied before the time-slot is over, idle symbols are transmitted through the switch. If the time-slot expires before the FIFO is empty, the packets remaining in the FIFO are retained and will be transmitted during a later time-slot when the switch is connected to the same output.

As an example of interchanger operation, consider the input stream 201 shown in FIG. 6. When packet 1a arrives, it is appended to FIFO 151 (associated with output 1), next packet 2a is appended to FIFO 152, packet 1b is appended to 151 behind 1a, and so on. During time slot t=1, when this switch input is connected to output 1, the multiplexer 160 selects FIFO 151 and packets 1a, 1b and 1c are output in sequence to reordered input stream 112 to be forwarded through the switch to output 1. (This assumes that no earlier packets remained in the FIFO to be transmitted before these packets). Next, during time-slot t=2, FIFO 152 is selected and packets 2a and 2b are transmitted on stream 112 to be forwarded to output 2, and so on.

Figure 9:
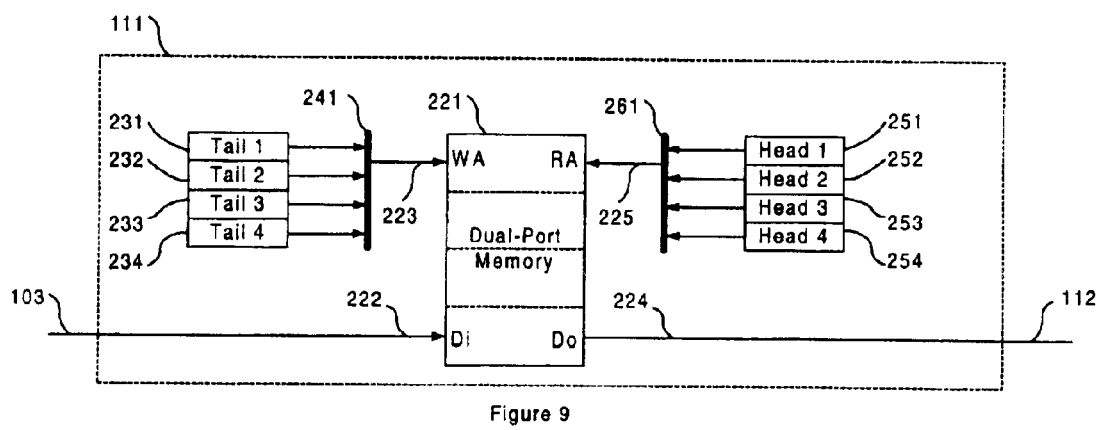
FIG. 9 illustrates a dual port memory implementation of a time-slot interchanger.

In a preferred embodiment of the present invention, the four FIFOs 151–154 of the TSI 111 are implemented with a single dual port memory 221, as illustrated in FIG. 9. In this embodiment, the contents of each FIFO are stored in dedicated circular buffers in memory 221 (denoted by the dotted lines). Memory 221 is a dual port memory with one read port and one write port. The write port consists of data input 222 and write address 223. The read port consists of data output 224 and read address 225. Each circular buffer is indexed by one of the tail pointers 231–234 and one of the head pointers 251–254. A write address multiplexer 241 selects one of the tail pointers to be used as the write address for memory 221. Similarly, a read address multiplexer 261 selects one of the head pointers to be used as the read address for memory 221.

When a packet arrives at the TSI of FIG. 9, the packet is examined to determine its output port and multiplexer 241 selects the tail pointer associated with this output. As each word of the packet arrives, it is placed on the data input line 222 and written into the appropriate circular buffer using tail pointer as the write address 223. The tail pointer is then incremented with a limit check to wrap address within the circular buffer. The tail pointer is also compared to the corresponding head pointer to check for a buffer-full condition. When a new time-slot begins, the output multiplexer selects the head pointer associated with the output corresponding to this time-slot to be used as the read address. All of the packets associated with the output are then read out of the selected circular buffer, incrementing the head pointer (with circular buffer wrapping) after each word of a packet is read. The head pointer is compared to the corresponding tail pointer after each increment to detect an empty circular buffer.

In one embodiment of the present invention, optical switch 114 is implemented using a $LiNbO_3$ non-linear optical crossbar switch. In an alternate embodiment, the switch is implemented as a multi-stage optical switching network, a described in Chamberlain, et al., "Design of an Optically-Interconnected Multiprocessor", IEEE 0-8186-8572-7/98.

The present invention allows data to be switched to the desired output of an optical switch with fixed control (the data need not to be examined to control the switch). However, it can only achieve full throughput when each input carries an equal amount of traffic destined for each output. This is because the switch schedule shown in FIGS. 4 and 5 is balanced, with each input connected to each output for equal amounts of time. If the input traffic is not balanced, one or more of the FIFOs in the interchanger may be overrun, resulting in loss of data.

Figure 7:
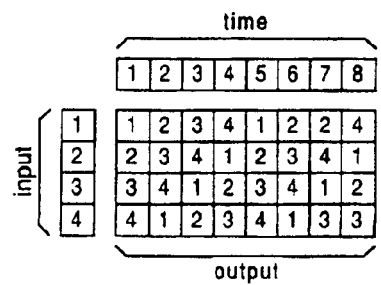
FIG. 7 illustrates an unbalanced schedule.

This requirement for balanced traffic can be overcome by using an unbalanced schedule, as illustrated in tabular form in FIG. 7. This figure illustrates an eight period schedule. In this schedule, input 1 sends three units of traffic to output 2, one unit of traffic to output 3, and two units of traffic to all other outputs. Input four sends three units to output 3, one unit to output 2, and two units to outputs 1 and 4. The traffic from inputs 2 and 3 is balanced.

Unbalanced switch schedules such as the one shown in FIG. 7 can be generated automatically by examining the occupancy of each of the four FIFOs in each of the four interchanges. When the occupancy of a FIFO (in the example, the FIFO from input 1 containing traffic destined for output 2) exceeds a threshold, the interchanger finds the input 1 FIFO with the least occupancy (in this case, the one containing traffic to output 3), and swaps outputs with the interchanger (in this case, the input 4 interchanger) that connects to 2 during the cycle that 1 would normally connect to 3. Hence, the schedule shown in FIG. 7 is generated.

While this schedule is dependent on the data being transported, it still has two properties that make it suitable for driving an optical switch. First, it reconfigures the switch at a frequency much lower than the packet rate. The switch is still set to one configuration during a period that spans many packets. In this case, however, the periods may be unbalanced to match the unbalance in input traffic. Second, it is latency sensitive. If the interchange FIFOs are sufficiently long, a considerable period may pass between when an imbalance is detected and when the switch schedule is changed.

In an alternative embodiment of the present invention, illustrated in FIG. 3, the position of the optical switch 114 and the TSI 111 are reversed. In this case, the switch output taken by a packet on the present telecommunications switch is determined by the TSI on the output of the upstream telecommunications switch: the switch that drives the input line 101. The TSI 111 on the output of that switch schedules packets so that they appear during the proper time-slot of the present switch.

One skilled in the art will understand that the present invention can be realized in a number of different forms. For example, the optical switch may be implemented using thermally actuated directional couplers, mechanically actuated optical switches, or piezoelectrically driven optical switches. The configuration of the switch may also be varied. While we have described the present invention in the context of a four-port crossbar switch, a crossbar with any number of ports may be implemented, a multi-stage network may be implemented, or a direct interconnection network may be implemented. The present invention can also be implemented with time slots of varying sizes. With slow acting mechanical, thermal, or piezoelectrically-driven switches, the time-slot may be increased to a millisecond or more (at the expense of larger FIFO buffers in the TSI).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A telecommunications switch comprising:
   an optical switch coupled to a plurality of optical inputs and a plurality of optical outputs;
   a switch controller being coupled to the optical switch, the switch controller operating the optical switch with a schedule not directly determined by an input stream of data units;
   a plurality of reordering units coupled to the optical switch through an electrical-optical converter, the plurality of reordering units buffering data units of received data streams into queues for each input/output pair of the optical switch and rearranging the order of the data units within the data streams to correspond to the schedule of the switch; and
   the switch controller changing the schedule of the optical switch to have unbalanced periods in response to unbalance in traffic, the schedule being changed in response to information provided by the plurality of reordering units regarding the number of reordered data units in the queues for each input/output pair.

2. A telecommunications switch as claimed in claim 1 wherein the switch is a crossbar.

3. A telecommunications switch as claimed in claim 1 wherein the reordering units rearrange the order of data units in an input data stream.

4. A telecommunications switch as claimed in claim 1 wherein the reordering units rearrange the order of data units in an output data stream.

5. A telecommunications switch as claimed in claim 1 wherein the switch is a multi-stage interconnection network.

6. A telecommunications switch as claimed in claim 1 wherein each reordering unit is a time-slot interchanger.

7. A telecommunications switch as claimed in claim 6 wherein each time-slot interchanger contains a plurality of FIFOs.

8. A telecommunications switch as claimed in claim 7 wherein the FIFOs are implemented as circular buffers in a single dual port memory.

9. A telecommunications switch as claimed in claim 1 wherein the switch schedule is determined by the average load between inputs and outputs.

10. The method of switching data streams comprising:
    operating an optical switch with a schedule not directly determined by an input stream of data units;
    converting optical data streams into electrical data streams;
    buffering data units of the converted data streams into queues for each input/output pair of the optical switch and rearranging the order of the data units within the data streams to correspond to the schedule of the switch; and changing the schedule of the optical switch to have unbalanced periods in response to unbalance in traffic, the switch schedule being changed in response to information regarding the number of reordered data units in the queues for each input/output pair.

11. A method as claimed in claim 10 wherein the switch is a crossbar.

12. A method as claimed in claim 10 wherein the rearranged data stream is an input data stream.

13. A method as claimed in claim 10 wherein the rearranged data stream is an output data stream.

14. A method as claimed in claim 10 wherein the switch is a multi-stage interconnection network.

15. A method as claimed in claim 10 wherein the data stream is rearranged in a time-slot interchanger.

16. A method as claimed in claim 15 wherein each time-slot interchanger contains a plurality of FIFOs.

17. A method as claimed in claim 16 wherein the FIFOs are implemented as circular buffers in a single dual port memory.

18. A method as claimed in claim 10 wherein the switch schedule is determined by the average load between inputs and outputs.

19. A telecommunications switch comprising:

a plurality of optical inputs;

a plurality of optical outputs;

switch means for switching optical inputs to optical outputs with a changing schedule;

control means for operating the switch means with a schedule not directly determined by an input stream of data units;

reordering means for buffering data units of received data streams into queues for each input/output pair of the optical switch and rearranging the order of the data units within the data streams to correspond to the schedule of the switch means, the reordering means being coupled to the switch means through an electrical-optical converter; and the control means changing the schedule of the optical switch to have unbalanced periods in response to unbalance in traffic, the schedule being changed in response to information provided by the reordering means regarding the number of reordered data units in the queues for each input/output pair.

20. A telecommunications switch comprising:

an optical switch coupled to a plurality of optical inputs and a plurality of optical outputs;

a switch controller being coupled to the optical switch, the switch controller operating the optical switch with a schedule not directly determined by an input stream of data units;

a plurality of reordering units coupled to the plurality of optical inputs through an electrical-optical converter, the plurality of reordering units rearranging the order of the data units within the input stream to correspond to the schedule of the switch by buffering the data units into queues for each input/output pair of the optical switch and forwarding the data units from the output queues according to the schedule of the switch; and the switch controller changing the schedule of the optical switch to have unbalanced periods in response to unbalance in traffic, the schedule being changed in response to information provided by the plurality of reordering units regarding the number or reordered data units in the queues for each input/output pair.

* * * * *